United States Patent [19]

Rees

[11] Patent Number: 5,748,344
[45] Date of Patent: May 5, 1998

[54] SYSTEM AND METHOD FOR DETERMINING A LOCATION AND ORIENTATION IN A BLACK AND WHITE DIGITAL SCANNER

[75] Inventor: James D. Rees, Pittsford, N.Y.

[73] Assignee: Xerox Corporation, Stamford, Conn.

[21] Appl. No.: 533,123

[22] Filed: Sep. 25, 1995

[51] Int. Cl.⁶ .............................. H04N 1/40; H04N 1/04; H04N 1/46
[52] U.S. Cl. .................. 358/505; 358/449; 358/487; 358/488; 358/494; 358/500; 358/506; 358/512; 358/514
[58] Field of Search ............................ 358/505, 509, 358/512, 513, 514, 506, 515, 400, 488, 474, 298, 487, 500; 348/265

[56] References Cited

U.S. PATENT DOCUMENTS

| | | | |
|---|---|---|---|
| 4,360,804 | 11/1982 | Ohura | 340/703 |
| 4,623,938 | 11/1986 | Asano et al. | 358/487 |
| 4,630,127 | 12/1986 | Fuwa | 358/285 |
| 4,816,903 | 3/1989 | Utsuda et al. | 358/487 |
| 4,875,104 | 10/1989 | Kamon | 358/512 |
| 4,989,099 | 1/1991 | Koshiyouji et al. | 358/474 |
| 5,041,866 | 8/1991 | Imoto | 355/38 |
| 5,065,185 | 11/1991 | Powers et al. | 358/512 |
| 5,146,321 | 9/1992 | Lees et al. | 358/505 |
| 5,510,908 | 4/1996 | Watanabe et al. | 358/448 |

Primary Examiner—Edward L. Coles, Sr.
Assistant Examiner—Mark Wallerson
Attorney, Agent, or Firm—Michael J. Nickerson

[57] ABSTRACT

A digital scanning system for scanning a document includes a full width array having two sets of color sensitive photosites, each set of photosites being sensitive to a different color of light and a backdrop portion. The backdrop portion is colored such that the backdrop portion appears nearly black to one set of color sensitive photosites and appears nearly white to a different set of color sensitive photosites. the scanning system further includes a light source, a document edge detection circuit operatively connected to the set of color sensitive photosites which perceive the backdrop portion as being nearly black, and an image processing circuit operatively connected to the set of color sensitive photosites which perceive the backdrop portion as being nearly white.

5 Claims, 3 Drawing Sheets

SYSTEM AND METHOD FOR DETERMINING A LOCATION AND ORIENTATION IN A BLACK AND WHITE DIGITAL SCANNER

FIELD OF THE PRESENT INVENTION

The present invention is directed to a digital document scanner which is capable of determining a document's location and orientation during a scanning of the document. More specifically, the present invention is directed to a digital document scanner that utilizes one configuration or channel of a full width array or CCD sensor during a scanning of the document so as to determine the location orientation of the document during a black/white scanning operation and another configuration or channel of the full width array or CCD sensor during a scanning of the document so as to generate image data representing the document during the black/white scanning operation.

BACKGROUND OF THE PRESENT INVENTION

FIG. 1 illustrates a conventional digital document scanner. In the conventional digital scanner, a light source 2 is used to illuminate a document 5 having the image to be scanned. The conventional digital scanner also includes a platen glass 4 upon which the document 5 rests and a platen cover 17. FIG. 1 also shows the optical center line 1 for the conventional digital document scanner. The light emitted by the light source 2 illuminates the document 5 or the platen cover 17 and is reflected off and imaged by an optical system or a lens system (not shown) accordingly towards either a CCD sensor or full width array (not shown) which converts the reflected light into electrical signals which are eventually converted into digital image data.

The platen cover 17 for a conventional digital scanner is constructed of a high diffuse reflectance white surface as it appears to the photo-sensitive devices and is positioned immediately above the document 5. This high diffuse reflectance white surface is illuminated by the light source 2 when the document 5 lying on the glass platen 4 is scanned. By constructing the platen cover of the digital scanner with a high diffuse reflectance white surface, the background of the white document and the surrounding platen cover surface present a similar, high reflectance to the optical system and photosensors or photoreceptor located below the platen glass. The high diffuse reflectance white surface enables the conventional document scanner to reduce or eliminate black borders around the copy document, black circles where punch holes exist in the document 5, or dark borders around multiple images such as multiple receipts on a single scan. Moreover, the high diffuse reflectance white surface enables the conventional document scanner to improve the contrast of the document's image by reflecting light which is transmitted through the document 5.

Although a high diffuse reflectance white surface can enable a conventional digital document scanner to remove undesirable dark areas, the high diffuse reflectance white surface can prevent a digital copier or digital scanner from realizing its full functionality potential. More specifically, digital scanners have the ability to detect the location of the input document's edges. This detection of the location of the input document's edges enables the digital scanner to provide electronic registration and electronic skew correction. Moreover, the detection of the location of the input document's edges enables the digital scanner to provide automatic magnification selection. However, this edge detection depends upon the ability of the digital scanner to sense the difference in the reflectance between the input document's background and the surrounding platen cover surface. Thus, a platen cover with a black surface (or specularly reflecting surface which appears black to the optical system) is preferred to allow the unambiguous detection of the extremes of a document with a lighter background.

While this low diffuse reflectance platen cover permits reliable detection of the input document's edges, the low diffuse reflectance platen cover fails to suppress printing of black borders or punch holes. Moreover, the low diffuse reflectance platen cover provides very low contrast images when transparencies are used as the input document.

In view of the adverse quality impact that a high diffuse reflectance platen cover has when utilized with a digital scanner and the problems associated with utilizing a low diffuse reflectance platen cover when trying to suppress undesirable dark areas, the present invention proposes a digital scanner which utilizes a color full width array to scan the document wherein a non-green channel of the color full width array is utilized to detect the location and orientation of the input document's edges and the green channel of the color full width array is utilized to generate image data representing the input document.

SUMMARY OF THE PRESENT INVENTION

One aspect of the present invention is a digital scanning station for scanning a document. The scanning station includes a a full width array having two sets of color sensitive photosites, each set of color sensitive photosites being sensitive to a different color of light, and a backdrop portion. The backdrop portion is colored such that the backdrop portion appears nearly black, when illuminated, to one set of color sensitive photosites and appears nearly white, when illuminated, to a different set of color sensitive photosites.

Another aspect of the present invention is a digital scanning system for scanning a document. The digital scanning system includes a full width array having two sets of color sensitive photosites, each set of color sensitive photosites being sensitive to a different color of light; and a backdrop portion. The backdrop portion is colored such that the backdrop portion appears nearly black, when illuminated, to one set of color sensitive photosites and appears nearly white, when illuminated, to a different set of color sensitive photosites. The system further includes a light source; document edge detection means, operatively connected to the set of color sensitive photosites which perceive the backdrop portion as being nearly black, for detecting edges of the document; and image processing means, operatively connected to the set of color sensitive photosites which perceive the backdrop portion as being nearly white, for processing image data generated from scanning the document.

A third aspect of the present invention is a method for digitally scanning a document. The method provides a backdrop portion having a predetermined color and scans the backdrop portion and document with a first set of photosites that perceive the backdrop portion as being nearly black to determine an edge of the document and with a second set of photosites that perceive the backdrop portion as being nearly white to produce digital image data relating to an image on the document.

A fourth aspect of the present invention is a digital scanning station for scanning a document. The scanning station includes an array of light sensitive photosites; a movable filter which moves between two positions, one position being in an optical path between the document and the array of light sensitive photosites and one position being outside of the optical path between the document and the array of light sensitive photosites; and a backdrop portion. The backdrop portion is colored such that the backdrop portion appears, when illuminated and the filter is in a first position, nearly black to the array of light sensitive photosites and appears nearly white, when illuminated and the filter is in a second position, to the array of light sensitive photosites.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
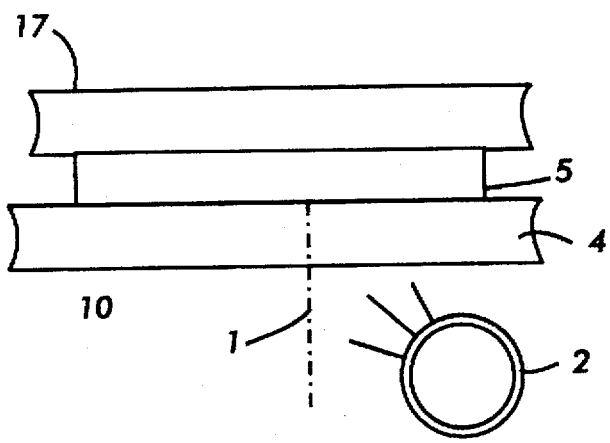
FIG. 1 is a block diagram illustrating the components of a conventional scanner.

For a general understanding of the present invention, reference is made to the drawings. In the drawings and in the specification, like reference numerals have been used throughout to designate identical or equivalent elements or steps.

Figure 2:
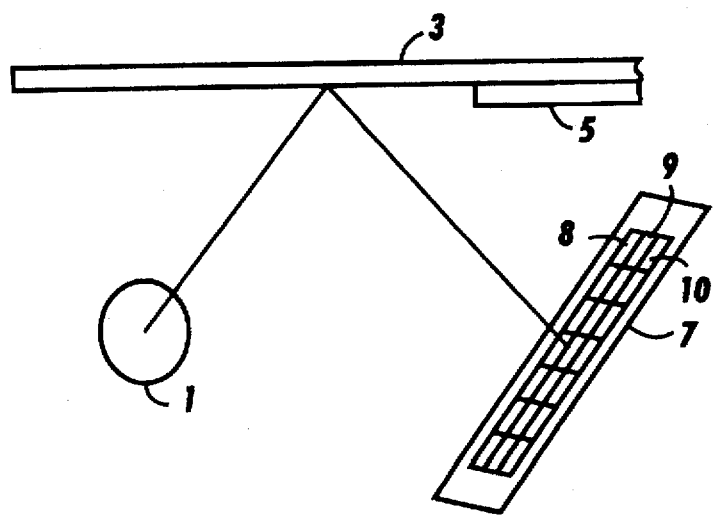
FIG. 2 is a block diagram illustrating the components of a digital scanner according to the present invention.

FIG. 2 illustrates the components of a digital scanner according to one aspect of the present invention. As illustrated in FIG. 2, a light source 1 is used to illuminate a document 5 to be scanned. In a platen type scanning situation, the document 5 usually rests upon a glass platen (not shown) which supports the document for scanning purposes. On top of the glass platen and document 5, a backdrop portion (platen cover) 3 is placed so as to prevent stray light from leaving the scanning area and to provide a background from which an input document can be distinguished.

The backdrop portion 3 is the portion or portions of the scanning station (platen or CVT) that can be scanned by a full width array 7 when a document is or is not present in the scanning station; i.e., the portion or portions of the scanning station that surround a document during scanning and provide a backdrop or border for the document.

The light reflected from the platen cover 3 or the document 5 is imaged by a lens subsystem (not shown) so that the reflected light impinges upon the full width array 7 which Includes an array of green color sensitive photosites 8, red color sensitive photosites 9, and blue color sensitive photosites 10 according to one aspect of the present invention. In a full color digital scanner, the arrays of photosites are used to produce the color image data representing the document that is being scanned; however, in a black/white digital scanner, only the array of photosites associated with a green filter is utilized to produce the black and white image data representing the image being scanned.

In another aspect of the present invention, the full width array 7 has two sets of color sensitive photosites, green sensitive and non-green sensitive photosites, preferably blue sensitive photosites.

In a third aspect of the present invention, the full width array 7 has only one set of light sensitive photosites, which, in conjunction with a movable filter (preferably a blue filter), provide two sets of data, edge detection data and image data. In this embodiment, a filter (not shown) slides into and out of the optical path between the light source and the photosites so as to affect the color characteristics of the light impinges upon the photosites. For example, if the filter is blue and the backdrop portion is saturated yellow, when the filter is in the optical path, the backdrop portion will appear nearly black to the photosites, thereby providing the opportunity to detect the edge of the document.

In order to detect the input document's edges, the present invention scans the glass platen area so as to determine the input document's location and orientation. During this scan operation, the light source 2 illuminates the platen cover 3 and the document 5. The light reflected from the platen cover 3 and document 5 is imaged by a lens system to the full width array 7. Although the reflected light impinges upon each array of color sensitive photosites, only the image signals generated by either the red sensitive photosites or the blue sensitive photosites (preferably the blue sensitive photosites) are processed so as to determine the location or an orientation of the input document. Furthermore, during the full image scanning mode, only the image signals generated by the array of photosites associated with the green channel are processed to provide black and white image data of the document being scanned.

Figure 3:
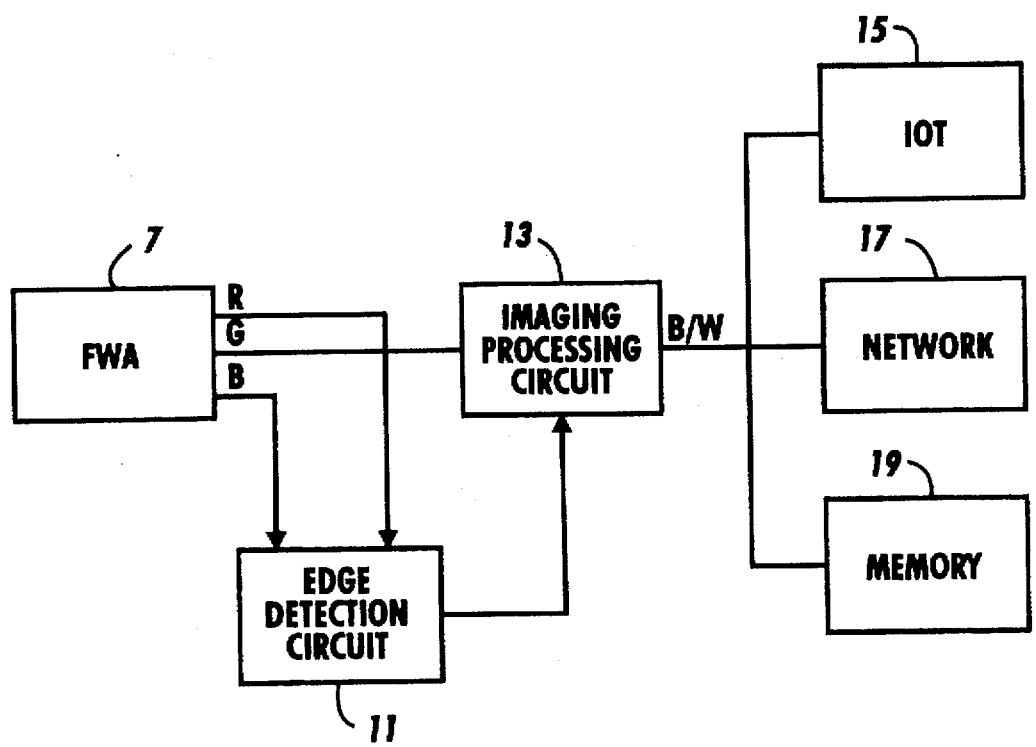
FIG. 3 is a block diagram illustrating the electronic architecture of a digital scanner according to the present invention.

FIG. 3 is a block diagram illustrating the electronic architecture of the digital scanner utilizing the concepts of the present invention. As illustrated in FIG. 3, a full width array 7 provides 3 channels of image signals corresponding to the 3 separate array of color sensitive photosites. More specifically, the full width array 7 produces a channel of red image signals, a channel of green image signals, and a channel of blue image signals. The channel of red image signals or the channel of blue image signals are fed into an edge detection circuit 11 which utilizes the image signals to determine the document's location and orientation. This determination of the document's location and orientation can be carried out by any of the conventional methods presently known.

In the preferred embodiment, the document location detection method is the process described in copending U.S. patent application Ser. No. 08/344,051, filed on Nov. 23, 1994 and entitled "Electronic Image Registration For A Scanner". The entire contents of U.S. patent application Ser. No. 08/344,051 are hereby incorporated by reference.

The edge detection circuit 11 then feeds the information with respect to the document's location and orientation into an image processing circuit 13 which electronically registers, deskews, and possibly automatically magnifies or reduces the electronic image that is to be processed by the image processing circuit 13. The image processing circuit 13 also receives the image signals associated with the green channel being produced by the full width array 7.

The image signals on the green channel are treated as black and white image data by the image processing circuit 13 wherein the image processing circuit 13 not only electronically registers, deskews, and automatically magnifies or reduces the electronic image, but processes the image data through the utilization of various conventional functions so that the black and white image data can be utilized by either an image output terminal 15, a network citizen 17, or memory device 19. Thus, as illustrated in FIG. 3, an image output terminal 15 such as a printer or display device, a network citizen 17, or a memory device 19 can be connected to the image processing circuit 13 for further processing of the black and white image data produced therefrom.

Figure 4:
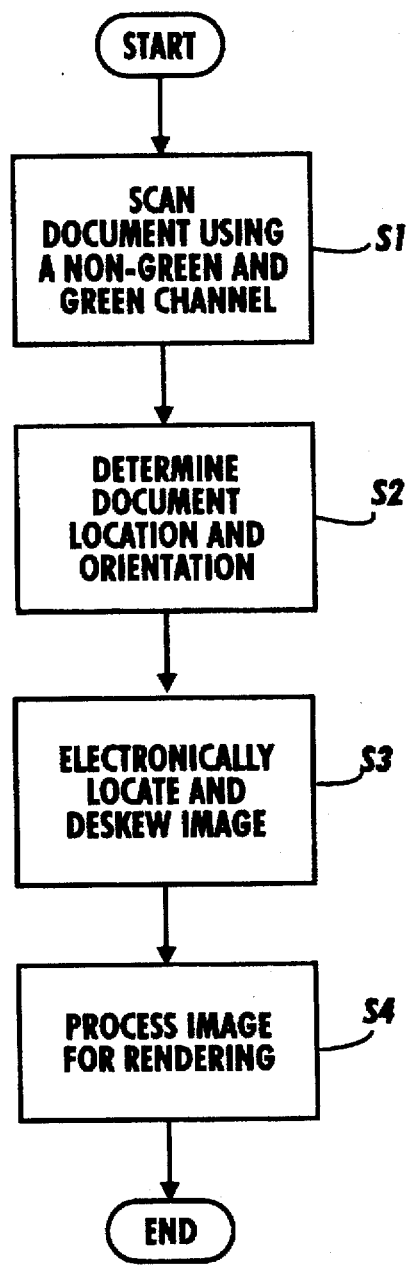
FIG. 4 is a flow chart illustrating the determination of the location and orientation of the input document's edges according to the present invention.

FIG. 4 is a flowchart illustrating the operations of the present invention. To enable a digital scanner to achieve its full functionality, the input document is scanned at step S1. At step S2, the present invention determines the input document's location and orientation from the image signals coming from one of the non-green channels of the full width array. After determining the document's location and orientation, the present invention, at step S3, utilizes the information determined at step S2 to electronically register and deskew the electronic image. Finally, the present invention processes the image data at step S4 so that the image data can then be sent on for further processing, manipulation, or rendering.

As discussed above, the present invention utilizes a non-green channel to determine where the original's document size and position are for the purposes of auto-magnification, electronic registration, and deskewing. In conjunction or in parallel with this process, the present invention processes the image data representing the actual image on the input document. As noted before, the edge detection mode requires high contrast between the original and its surrounding background; i.e., the platen cover; which is realized with a platen cover having an appearance of a low diffuse reflectance to the photosites. On the other hand, the present invention provides a situation where the platen cover appears to have the characteristics of high diffuse reflectance to the photosites so that the present invention can reduce or eliminate dark border edges, circles, or other undesirable dark areas in the rendered image.

In another embodiment of the present invention, the digital scanner can perform two scans of the document, a prescan and a full scan. in this embodiment, the input document is pre-scanned wherein only the nongreen channel of image data is processed. The present invention determines the input document's location and orientation from the image signals coming from one of the non-green channels of the full width array. After determining the document's location and orientation, the present invention carries out a full scan of the document wherein the image signals from the green channel are utilized to produce the black and white image data. The present invention utilizes the information determined from the non-green channel of image data to electronically register and deskew the electronic image. Finally, the present invention processes the image data so that the image data can then be sent on for further processing, manipulation, or rendering.

As discussed above, the present invention utilizes a prescan mode where the original's document size and position are sensed for the purposes of auto-magnification, electronic registration, and deskewing. Following the prescan of the input document, the present invention performs a full scan of the original document for the generation of image data representing the actual image on the input document. As noted before, the first mode, prescan mode, requires high contrast between the original and its surrounding background; i.e., the platen cover; which is realized with a platen cover having a low diffuse reflectance. On the other hand, the second mode, the full scan mode, requires a platen cover having a high diffuse reflectance in order to reduce or eliminate dark border edges, circles, or other undesirable dark areas in the rendered image.

To achieve all of the above results, the present invention, in one embodiment, utilizes the green channel of a color full width array sensor in order to generate the image data representing the image being scanned. In addition, the present invention utilizes one of the non-green channels of the color full width array sensor in conjunction with a particular colored platen cover to provide the information needed for locating the document and its size and orientation.

In the preferred embodiment of the present invention, the image signals from the green channel of the full width array sensor are utilized to generate the image data representing the document being scanned. Moreover, in this embodiment, the image signals from the blue channel of the full width array sensor are utilized in detecting the document's size, location, and orientation. In conjunction with the utilization of the image signals from the blue channel, the platen cover for this particular embodiment is saturated yellow. By having a saturated yellow platen cover, the platen cover will appear to be very dark to the blue sensor array which is desired during operations that are sensing the location of the document and allow the green channel to capture a yellow background document, such as legal pad paper which has a pastel yellow color. However, the saturated yellow platen cover will appear white to the green sensor array which is desired during the operations which produce the image data representing the document.

Alternatively, in a second embodiment of the present invention, a cyan colored platen cover can be used in conjunction with the red sensor array. In this embodiment, the cyan colored platen cover would appear to be very dark to the red sensor array. On the other hand, the cyan colored platen cover would appear to be white to the green sensor array.

Therefore, utilizing either a yellow/blue combination or a cyan/red combination, the present invention can perform a concurrent or serial bi-modal scanning of an image document wherein the first mode is a mode which is utilized to determine the location, size, and orientation of the input document, and the second mode is utilized to generate the actual image data representing the document being scanned.

Moreover, even though the present invention has been described with respect to a platen-type scanning station, the present invention is applicable to any type scanning station. For example, if the scanning station is a constant velocity transport (CVT) scanning station, a platen cover would not be utilized, but the background area of the CVT can be painted with the colors described above. Moreover, in the CVT system, a prescan would not be utilized. The channels providing the location information would be monitored until an edge is detected and then the scanner would immediately switch over to the other channel to begin processing the image data.

Furthermore, the present invention has been described as utilizing the green channel as the image input channel; however, the red or blue channel could operate in the same manner wherein the color scheme of the platen cover or CVT background would have to be changed accordingly. More specifically, the relationships of the colors must be such that the color of the backdrop portion appears nearly black to the green sensitive photosensors and nearly white to the red or blue sensitive photosensors.

Lastly, the edge detecting mode can be overridden by a user by placing the digital scanner into a transparency mode.

By placing the scanner in a transparency mode, the scanner will only scan in the high reflectance mode which is necessary when scanning transparencies.

While the present invention has been described with reference to various embodiments disclosed above, it is not confined to the details set forth above, but is intended to cover such modifications or changes as may come within the scope of the attached claims.

What is claimed is:

1. A method for digitally scanning a document, comprising the steps of:
   (a) providing a backdrop portion having a predetermined color;
   (b) scanning the backdrop portion and document with a first set of photosites that perceive the backdrop portion as being nearly black to determine an edge of the document;
   (c) scanning the backdrop portion and document with a second set of photosites that perceive the backdrop portion as being nearly white to produce digital image data relating to an image on the document;
   (d) determining if a transparency mode command has been entered by a user; and
   (e) causing said step (b) to be bypassed when said transparency mode command has been entered.

2. The method as claimed in claim 1, wherein the predetermined color of the backdrop portion is saturated yellow.

3. The method as claimed in claim 1, wherein the predetermined color of the backdrop portion is cyan.

4. The method as claimed in claim 1, wherein the first set of photosites are sensitive to blue.

5. The method as claimed in claim 1, wherein the first set of photosites are sensitive to red.

* * * * *